Jan. 20, 1970 J. H. MYER 3,490,950

SELECTIVE CONVERSION OF SOLAR ENERGY WITH RADIATION RESISTANT SOLAR ENERGY CONVERTER ARRAY

Filed May 26, 1964 2 Sheets-Sheet 1

INVENTOR.
JON H. MYER,
BY
Charles S. Haughey
ATTORNEY.

INVENTOR.
JON H. MYER,
BY Charles S. Haughey
ATTORNEY.

United States Patent Office 3,490,950 Patented Jan. 20, 1970

3,490,950

SELECTIVE CONVERSION OF SOLAR ENERGY WITH RADIATION RESISTANT SOLAR ENERGY CONVERTER ARRAY

Jon H. Myer, Newport Beach, Calif., assignor to Hughes Aircraft Company, Culver City, Calif., a corporation of Delaware Filed May 26, 1964, Ser. No. 370,158
Int. Cl. H01m 29/00
U.S. Cl. 136—89 9 Claims

ABSTRACT OF THE DISCLOSURE

Selective conversion of solar energy to electrical energy in the presence of damaging nuclear radiation by use of a radiation resistant solar cell array having support wall structure arranged to shield cells from direct nuclear radiation and to reflect solar radiation onto the cell.

Natural radiation sources of penetrating particles are generally from random directions in space, such as cosmic, solar flare, particle and Van Allen radiation. Electromagnetic radiation, commonly called solar radiation, is predominantly unidirectional from the sun, reflectable, and is of interest here primarily for its visible radiation. Solar cell radiation shielding is conventionally provided to extend the life of solar cells, such as N on P silicon solar cells, which are exposed to the penetrating particle radiation to a degree sufficient to deteriorate the solar cell. Such radiation shielding is customarily provided by coverings of glass or quartz, usually as films or layers deposited on the solar cells. The protective layer provided by glass or quartz on the surface of solar cells allows electromagnetic radiation to pass through somewhat attenuated by the film material, and absorbs the penetrating particle radiation to the limit of the energy which it can contain in the thickness of protective shielding used. Such films pass a high proportion of the visible light, or the energetic electromagnetic radiation, but they do attenuate the desired radiation and they fail to take any advantage of directionality or reflectivity of electromagnetic radiation, which is normally utilized as an energy source for solar cells.

It is well known that solar cell materials are subject to substantial degradation under penetrating particle radiation but not under electromagnetic radiation. For this reason, glass or quartz shields, which may be 60 mils in thickness or more, may be bonded to the surface of a 10 to 12 mil thick solar cell to reduce particle radiation damage. Often the bonding materials, such as epoxy resins, are themselves sensitive to radiation in certain wavelengths; and, to protect the bonding materials, additional filter or shield material is often placed upon the glass or quartz shielding to filter out the radiation to which the bonding material is most sensitive, thus further reducing the transmission to the solar cell itself of the desired electromagnetic radiation. In the present invention advantage is taken of the fact that penetrating particle radiation does not reflect substantially from polished or mirror surfaces, and the desired electromagnetic radiation may be so reflected with efficiencies up to about 90 percent. Although the space environment will reduce reflection efficiency in time, reflection efficiencies in excess of 45 percent can be maintained over extended periods while subject to penetrating particle radiation damage.

Further advantage can be taken of the directionality of the desired radiation and the random direction of sources of particle radiation by removing the shield from the surface of the cell, or markedly reducing its thickness, and reflecting electromagnetic radiation from a reflective or polished surface to the cell behind the shield while maintaining the solar cell surface substantially protected by the shield from the direct penetrating particle radiation. This also makes possible the substitution of lighter and more effective material for the shielding which may also be a useful structural material. Such shields are no longer required to pass the electromagnetic radiation, from which the solar cell obtains its energy. This construction provides an unusually long lived solar cell.

Solar cells of silicon are generally preferred for their light weight, they have a specific gravity of about 2.3, and shielding materials of glass and quartz which are satisfactory for transmission of electromagnetic radiation have generally a specific gravity of about 3 to 4. The conventional glass or quartz shielded silicon solar cells are very heavy and provide an opportunity for a weight trade-off. Material such as aluminum or other metals may be used as a shield from particle radiation in lieu of the transparent films discussed, as a surface for reflection of electromagnetic radiation, or as a support for a reflective coating for such electromagnetic radiation, and as a physical support for the solar cells. Since the reduced reflectivity of a polished surface due to particle radiation damage has its parallel in the scattering effect of surface damage and loss of transmission of electromagnetic radiation in glass or quartz, the harmful effects of particle radiation are not peculiar to the reflective shielding system, and the amount of radiation energy reflected onto the cells may be predetermined by known radiation conditions and design.

Other advantages and characteristics of this invention will become apparent from the description and explanation of the invention. For consideration of what I believe to be novel and my invention, attention is directed to the following portion of this specification, including the drawings, which describes the invention and the manner and process of making and using it.

In the drawings, FIG. 1 shows a perspective view in partial cross section of a solar cell energy converter array utilizing reflected electromagnetic radiation according to this invention;

Figure 1:
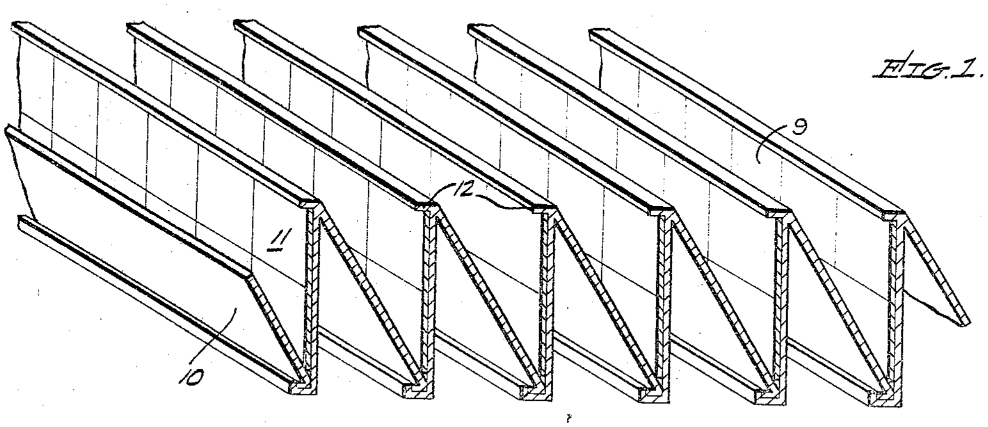

As shown in FIG. 1, an array according to this invention may comprise a series of extruded shapes 10 of a particle radiation shielding material such as aluminum supporting solar energy converter cells 11, preferably silicon solar cells, in a manner substantially protecting the cells from direct penetrating particle radiation while exposing them to reflected electromagnetic radiation. A small percentage of direct radiation through an aperture 9 formed by the assembled shapes 10 may be tolerated but is not an objective of the array. A proportionately smaller amount of particle radiation entering the aperture, than electromagnetic radiation, will reach the solar cell because the electromagnetic radiation may be focused, and the particle radiation is from random directions. The series of supports 10 are arranged in an interlocking position to present a V-shaped recess to the source of electromagnetic radiation which enters the aperture of the assembly. The support structures have silicon-solar cells secured to one surface of the V in a plane substantially perpendicular to the opening and have the opposing surface of the V polished or coated to reflect electromagnetic radiation onto the solar cell surface. The solar cell 11, here assumed to be of the silicon type, may present an edge to direct radiation through the aperture, or an additional portion 12 of shielding material may be placed along the edge to protect the silicon solar cell. The array of FIG. 1 is specially adapted for use in an oriented structure where the plane of solar cells as shown is parallel to the electromagnetic radiation. The structure could be rotating to hold the solar cells in that plane, and the array could then be supported around the rotating structure, or the structure might be constantly aimed in one direction. The direct penetrating particle radiation which can reach the solar cells in the array of FIG. 1, through the aperture, is a small fraction of that to which they would be exposed in a conventional film-coated array facing directly outwardly toward the electromagnetic radiation, and the solar cell life is correspondingly extended.

The structure of the solar cells 11 as such is not critical to this invention, and presently available structures may be used. Shingle-like or articulated assemblies as shown in U.S. Patents 2,938,938 and 3,094,439 are examples of solar cells known in the art which are useful in the array of FIG. 1.

Figure 3:
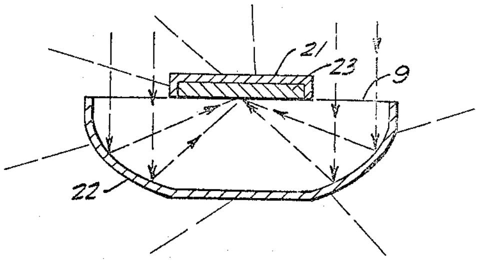
FIGS. 2, 3, 4 and 5 show alternate forms of the invention, partly in section.
Figures 2, 5:
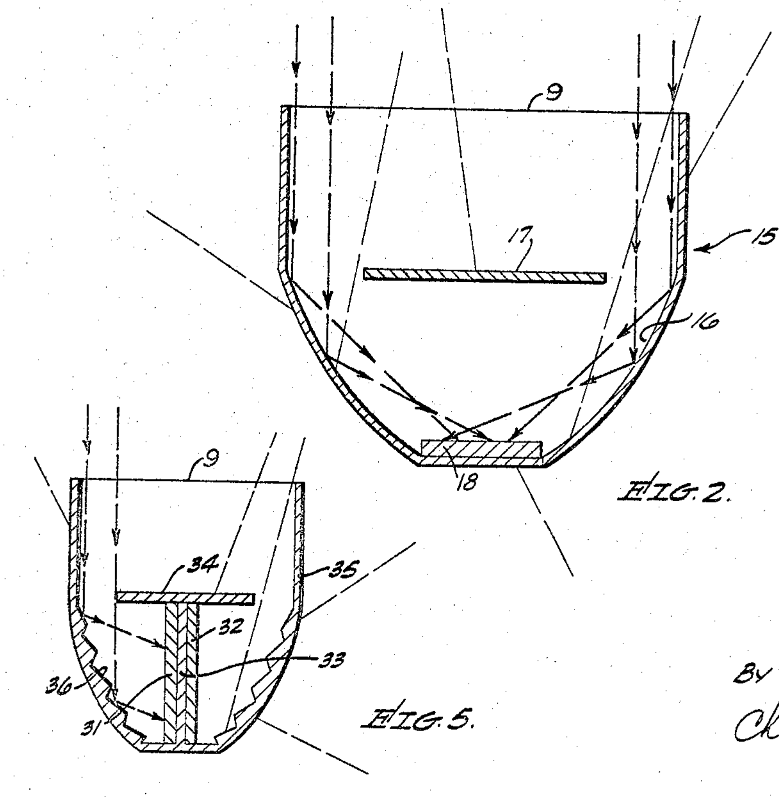

FIG. 1 shows parallel elements of solar cell reflector-shield-support elements which allow a small portion of penetrating particle radiation to directly strike the solar cells. Alternate embodiments of the invention may be used to completely avoid such exposure. FIG. 2, for example, shows a shielding and reflective solar cell support element 15 comprising shielding and reflective side walls 16 and a shield plate 17 in conjunction with a solar cell 18 supported on the element 15. This construction is adaptable to random orientation of the array with respect to the solar radiation (heavy lines with arrow heads) and with a full circle protection from penetrating particle radiation (light dashed lines). It also bonds the solar cell to a metal surface from which radiation cooling is available to avoid over heating of the solar cell. A variation of this structure shown in FIG. 3 places the solar cell on the bottom side of the plate 21 and gives full circle protection from particle radiation without extending the reflecting walls 22 beyond the place of the solar cells 23. This structure, like that of FIG. 2, may be figures of revolution or may be elongate structures of the cross-section shown. FIG. 3 also faces the back side of the cell support plate outwardly, which provides an improved radiation cooling of the cell as well as a minimum of shield material.

Figure 4:
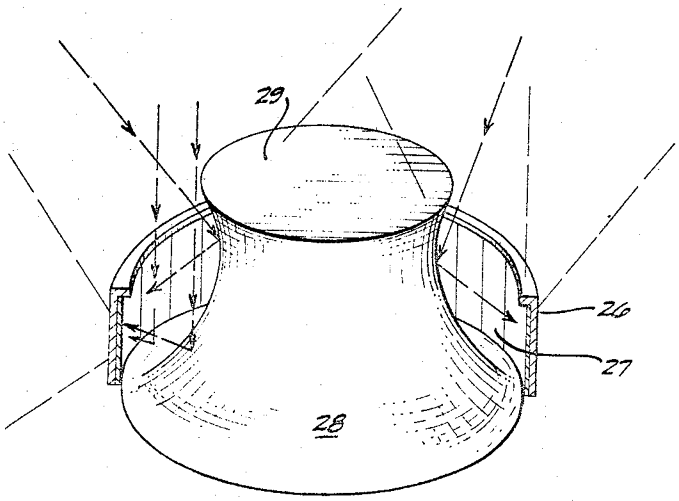

FIG. 4 shows a cylindrical shielding and support wall 26 supporting solar cells 27 on the inner side thereof, and a curved reflecting surface 28 which may, if desired, support a cover plate 29, of shielding material. This configuration is easily adapted to receive electromagnetic radiation from a wide range of source angles.

FIG. 5 shows an alternate structure similar to that of FIG. 2 in section, but supporting solar cells 31, 32 on a vertical rib 33, protected by an overlying shield plate 34, and arranged to receive reflected radiation energy from shielding sidewalls 35 whose inner surface is shown with stepped or segmental, reflector portions 36 to improve focus of the side reflecting walls. This structure makes possible a deeper rib 33 and thus greater solar cell area subject to reflected radiation, and consequently less heating effect on the individual solar cells.

The particular structural configuration will be selected to optimize penetrating particle radiation shielding, reflection of electromagnetic (solar) radiation, adequate solar cell support, long cell life and minimum weight. In some applications rigidity of support may dictate an articulated array such as that of FIG. 1.

Figure 6:
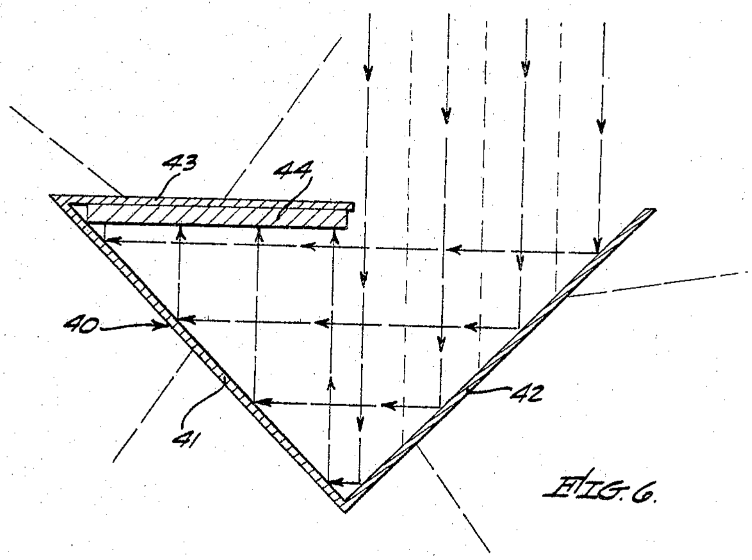
FIG. 6 is a view in section of another alternate form of the invention which utilizes double reflection.

The array structure illustrated in FIG. 6 in cross section comprises a double reflection V support 40 having planar reflecting surfaces 41 and 42 together with a solar cell support section 43 to which solar cells 44 are bonded. The structure may be utilized in a parallel array of the type illustrated in FIG. 1 or it may be utilized in an array of a figure of revolution such as illustrated in FIG. 4. The structure of FIG. 6 shows a double reflection of electromagnetic radiation and thus reduces the efficiency of energy conversion, but it also provides a 100 percent shielding from direct particle radiation with a very simple structure and will provide a long lasting structure when exposed to a damaging penetrating particle radiation environment.

In each of the structures shown it is desirable to provide a highly reflective surface for the reflection of electromagnetic energy onto the solar cell. This may be done by highly polishing the support material as such or by depositing highly reflective coatings such as chromium plating, on those surfaces. Selective wavelength dichroic coatings may be used. Thus any suitable reflecting surface may be provided on an optimium shielding and support material to take advantage of the sturdy light weight structural and shielding materials which may be utilized, and the shielding material may be used to structurally support the solar cells instead of requiring additional structural support material to support heavy, glass or quartz shielded solar cells.

I claim:

1. A solar energy converter array for use in a nuclear radiation environment, comprising:

a solar radiation energy converter; and a support structure having nuclear radiation shielding walls shielding the converter from essentially all direct radiation from all directions comprising a first portion supporting the converter, an aperture forming portion, and a reflective surface portion positioned to receive solar radiation directly through said aperture and to reflect a portion of the same onto the converter.

2. A solar energy converter according to claim 1 wherein the reflecting surface is curved to focus solar radiation from a relatively large reflective surface portion to a relatively smaller converter.

3. A solar energy converter array according to claim 1 wherein the first portion is bonded in thermal contact to the converter, and is in turn exposed to radiate heat and thereby cool the converter.

4. A solar energy converter array according to claim 1 having the converters thereof mounted on a planar surface parallel to the direction of solar radiation around a rotating body whereby during a complete revolution a substantial proportion of reflected solar radiation would at all times be received by at least some converters in the array.

5. A solar energy converter array according to claim 1, wherein the first portion is positioned between the aperture and the converter and thereby shields the converter from nuclear radiation which enters the aperture.

6. A solar energy converter according to claim 1 wherein the converter is mounted with its receiving surface parallel to the direction of solar radiation.

7. The method of converting solar radiation energy, from a radiation field of directional solar radiation and random nuclear radiation, to electrical energy, which comprises:

mounting a solar energy converter on a support structure having nuclear radiation shielding walls in a manner to shield the converter from essentially all direct radiation, the structure having an aperture for receipt of direct radiation, and having a reflecting surface for selectively reflecting solar radiation from the aperture onto the converter without substantial reflection of nuclear radiation onto the converter; and exposing the reflecting surface of the structure to solar radiation through the aperture in a field of random nuclear radiation whereby to selectively reflect solar radiation onto the converter.

8. The method of claim 7 wherein the support structure is on a spinning body having a portion of the reflective surface always exposed to solar radiation through the aperture.

9. The method according to claim 7 wherein the converter is bonded in thermal contact to a portion of the structure which portion is in turn exposed to radiate heat and thereby cool the converter.

References Cited

UNITED STATES PATENTS

| | | | |
|---|---|---|---|
| 2,201,606 | 5/1940 | Bing. | |
| 2,206,196 | 7/1940 | Kubitzek. | |
| 2,919,298 | 12/1959 | Regnier et al | 136—89 |
| 2,951,163 | 8/1960 | Shaffer et al. | 136—89 X |
| 3,232,795 | 2/1966 | Gillette et al. | 136—89 |
| 3,278,811 | 10/1966 | Mori | 136—89 X |

OTHER REFERENCES

Detecting Fire at Sea—in Electronics—July 1944 (only p. 125 relied on).

Campbell: Effect of Radiation on Transmission of Glasses and Adhesives—in 17th Annual Power Sources Conference—May 1963 (only pp. 19–22 relied on).

ALLEN B. CURTIS, Primary Examiner